UNITED STATES PATENT OFFICE.

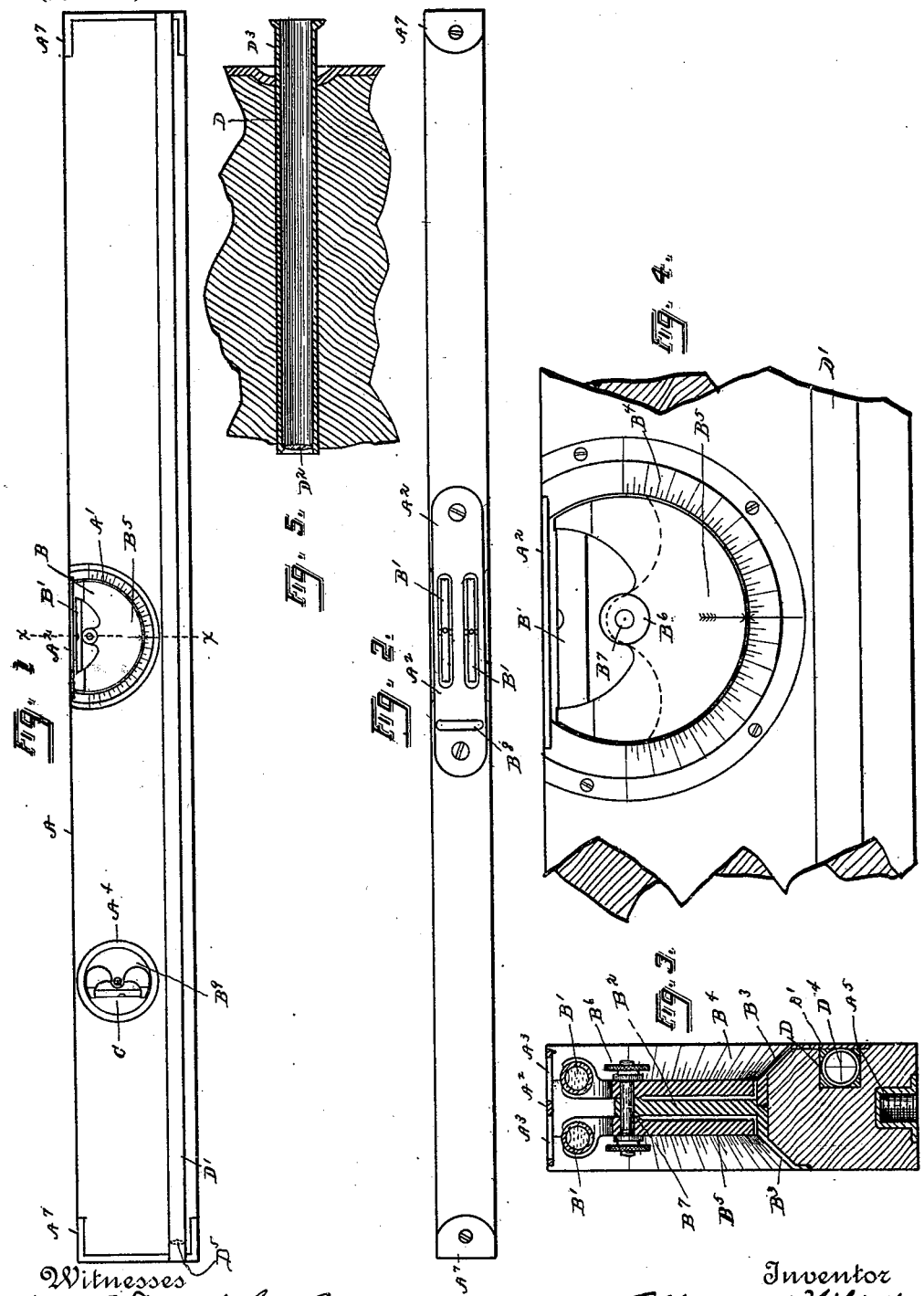

MAGNUS NILSON, OF OAKLAND, CALIFORNIA.

LEVELING INSTRUMENT.

SPECIFICATION forming part of Letters Patent No. 646,098, dated March 27, 1900.

Application filed March 6, 1899. Serial No. 707,931. (No model.)

*To all whom it may concern:*

Be it known that I, MAGNUS NILSON, a citizen of the United States, residing at Oakland, in the county of Alameda and State of California, have invented certain new and useful Improvements in Leveling Instruments; and I do hereby declare the following to be a full, clear, and exact description of said invention, such as will enable others skilled in the art to which it most nearly appertains to make, use, and practice the same.

This invention relates to leveling instruments; and it consists of the novel construction and arrangement of the elements, as hereinafter more fully set forth.

The objects sought to be accomplished are, first, to provide a registering spirit glass or glasses to register with a protractor to determine the angle of inclination, and, second, to provide a telescopic peep-tube in the body of the leveling instrument to be used in connection with a tripod, plumb-bob, and leveling-staff.

In the drawings, Figure 1 is a side elevation of a leveling instrument constructed in accordance with this invention. Fig. 2 is a plan view of the same, taken from above. Fig. 3 is an enlarged detail in cross-section, taken on the line X X, Fig. 1. Fig. 4 is an enlarged detail, in side elevation, of the spirit-glasses for determining the inclination on the horizontal plane, the body of leveling instrument being broken away. Fig. 5 is an enlarged detail showing the slidable tube in the end of the leveling instrument.

To facilitate the description with reference to the drawings, distinguishing letters of reference will be assigned to the various elements of combination. To the body of the leveling instrument the letter A will be assigned, to the leveling-glasses on the horizontal plane the distinguishing-letter B, to a similar glass on the vertical plane the distinguishing-letter C, and to the telescopic peep-tube the distinguishing-letter D. These common letters will be strengthened by the addition of a numeral in designating the minor instrumentalities of each group.

In construction this instrument is built on lines similar to the common carpenter's level—that is, the body A is made of wood or metal, formed for the accommodation of the spirit-glasses and the sighting tube or channel D. As illustrated, the body A is made of wood.

Centrally located at the upper edge of the body A and opening upon said edge the segmental recess A' is formed for the accommodation of the spirit-glasses B' B', pivoted on the web $B^2$, fastened to the body and extending within the cavity A', said web also extending between the glasses B' B'.

Formed integrally and extending upon the one side of the web $B^2$ is the segmental annular flange $B^3$, having formed on its beveled surface, which is preferably set at an angle of about forty-five degrees, the graduated scale or protractor $B^4$. This flange and protractor is duplicated on the other side of the web $B^2$, the inner edge of the flange extending under the web $B^2$, as shown in Fig. 3, to insure rigidity and neatness of workmanship.

On the face of the mounting of the spirit-levels B' B' are the indexes $B^5$, alining with the graduations of the protractors $B^4$. To set the spirit-glasses at the desired angle, the thumb-screws $B^6$ are provided on the pivotal shaft $B^7$ for the purpose of holding or jamming the spirit-levels at the desired angles.

Extending over the top of the mechanisms just described is the brass plate $A^2$, having the slots $A^3$ $A^3$ formed therein, through which the levels B' B' are enabled to swing on their pivotal centers. At right angles to these slots $A^3$ $A^3$ and mounted in the plate $A^2$ is the spirit-level $B^8$.

The spirit-levels just described are calculated for determining inclinations on a horizontal plane. Located between the end and center of the body of the level is the straight central bore $A^4$, into which is fitted a suitable pivotal mounting $B^9$ for a spirit-glass similar to B'. The pivotal feature of this glass is to provide a means of adjustment in the event of inaccuracy, and said glass is for use in connection with a plumb-bob or in determining inclination on the vertical plane.

Into the body A of the level, extending longitudinally from end to end thereof, the channel D is cut. The channel form is preferred as being most easily formed, it being only necessary to run the body A against a rotary header adapted to this purpose. The channel D when formed is converted into a darkened tube or passage by securing the brass strips D' over it. Into the one end of this channel, as illustrated in Fig. 5, the objective-glass $D^2$, mounted in the tubular body $D^3$, is slidably inserted. The body $D^3$ fits the channel snugly enough to prevent the entrance of light, but with sufficient play to allow for its sliding inward or outward of the channel to allow the focusing of the objective-glass $D^2$ with a complementary eyeglass $D^5$, similarly inserted in the other end of the channel. Intersecting the channel are the lines $D^4$, similar to those in a transit, the requirements of which this channel is calculated to fill in connection with a tripod, which may be secured to the body of the level by means of the socket $A^5$, as shown in Fig. 3.

The ends of the body A are capped by the metallic plates $A^7$ $A^7$, having suitable perforations to leave a free sight through the channel D.

Before leaving the factory the index $B^5$ is determined with relation to the protractor-graduations $B^4$, so that the correct setting of the spirit-levels may be readily accomplished.

The principal advantage of this level over those now known is the ability to determine the various angles of inclination and register the same as well as the advantage gained by reason of the attachment of the transit-glasses. The swinging levels B' B' are a particular advantage when it is desired to set a surface to a given angle. For instance, we desire to incline a floor or the like at an angle of twenty degrees. The index would be set to the desired degree on the protractor $B^4$ and the level used in the usual manner pursued in determining a horizontality. As is evident, when the bubble in the level came to the center the body of the level would be at an angle of twenty degrees thereto.

A further description of the manipulation of the invention is deemed unnecessary.

By providing the companion levels B' B', having the same registering-points, it is made impossible for the instrument to become inaccurate as to its leveling properties without at once warning the operator. So long as the two companion levels register the same the operator knows that his levels are accurate. As soon, however, as said levels fail to register the same he knows immediately that he is using an unreliable instrument and is thus warned to discontinue the use of the same. The small glass $B^8$ is provided for use in connection with the transit, tripod, and leveling-staff.

Various mechanical changes can be made in this instrument without altering the spirit of invention.

Having thus described this invention, what I claim is—

1. In an instrument of the character specified, a plurality of companion levels having the same registering-point, whereby said levels serve to correct each other; substantially as described.

2. In an instrument of the character indicated, a body having a recess therein, a web fastened to said body and extending into said recess, a pivotal shaft provided with threaded ends extending through said web, a spirit-level tube pivoted upon said shaft at each side of said web, and thumb-screws upon the ends of said shaft, whereby the said spirit-level tubes can be clamped in position; substantially as described.

In testimony whereof I have hereunto set my hand this 9th day of February, 1899.

MAGNUS NILSON.

Witnesses:
M. H. HARMS,
BALDWIN VALE.